United States Patent
Rainer et al.

[15] 3,674,722
[45] July 4, 1972

[54] MICROPOROUS STRUCTURE AND METHOD OF MAKING THE SAME

[72] Inventors: Norman B. Rainer, Richmond; Peter A. Wilson, Midlothian, both of Va.

[73] Assignee: Philip Morris Incorporated, New York, N.Y.

[22] Filed: Aug. 10, 1970

[21] Appl. No.: 62,647

[52] U.S. Cl............................260/2.5 M, 131/269, 260/2.5 P, 260/29.6 ME, 260/33.4 R, 260/895, 260/899, 264/48, 264/109
[51] Int. Cl..........................................................C08f 47/08
[58] Field of Search...................................260/2.5 M, 2.5 P

[56] References Cited

UNITED STATES PATENTS

| | | | |
|---|---|---|---|
| 2,806,256 | 9/1957 | Smith-Johannsen | 260/2.5 M |
| 3,440,185 | 4/1969 | Hanley | 260/2.5 P |
| 3,528,433 | 9/1970 | Johnson et al. | 131/10.5 |
| 2,864,777 | 12/1958 | Greenhoe | 260/2.5 P |

*Primary Examiner*—John C. Bleutge
*Attorney*—Watson, Leavenworth & Kelton

[57] ABSTRACT

This disclosure relates to a novel process and to a novel product produced thereby. The product comprises a vinyl chloride polymer having an improved microporous structure and is made by a process which involves dispersing a vinyl chloride polymer latex, i.e., an aqueous suspension of a vinyl chloride polymer, in an organic liquid which is a non-solvent for the polymer, preferably removing most of the water, and heating the resulting dispersion to sinter the vinyl chloride polymer particles to form a microreticulated microporous structure. The vinyl chloride polymer latex may, for example, be a colloidal suspension of polyvinyl chloride particles in water. Such a latex may be obtained commercially or may be prepared by conventional methods. The non-solvent organic liquids should be water-miscible and should have a boiling point above 130° C. and exhibit substantially no solvating or swelling effect on the vinyl chloride polymer. The improved microporous structure of this invention is particularly useful as a filter material. The process of the invention is especially suited for the formation of shaped porous articles which are useful as filters.

11 Claims, No Drawings

MICROPOROUS STRUCTURE AND METHOD OF MAKING THE SAME

It is known to prepare articles having a microporous structure by sintering a mixture of a thermoplastic synthetic resin, such as polyvinyl chloride, a plasticizer for the resin, for example dioctyl phthalate, and an organic liquid non-solvent for the resin, for example xylene, to a temperature at which the resin fuses while under a pressure sufficient to maintain the liquid in a liquid phase until a microreticulated structure is formed. The non-solvent may be retained in the structure to serve as an absorbed functional fluid, for example the structure may serve as an ink vehicle. However, the non-solvent may be removed by reducing the pressure and/or heating. Such a product and process are described in U.S. Pat. Nos. 2,777,824 and 3,055,297. However, such products do not always have a desired degree of uniformity and are not well adapted for use as filter materials.

Microporous structures may also be prepared, particularly for use in granular form as filter material for cigarettes, by heating together a thermoplastic synthetic resin powder, such as polyvinyl chloride, and certain organic liquid non-solvent liquids for the resin to a temperature at which the resin powder fuses and under a pressure sufficient to maintain the non-solvent liquid in the liquid phase. The mixture may optionally contain a plasticizer. The non-solvent, for example decalin or dodecane, and plasticizer, when employed, are removed or extracted after fusion by exposing the fused resin to vapors of a heated second liquid, such as lower alcohols. This product and process, which are more fully disclosed in application Ser. No. 714,762, filed on Mar. 21, 1968 of W. R. Johnson, J. S. Osmalov and R. N. Thomson, now U.S. Pat. No. 3,528,433, provide a material capable of being readily comminuted or ground to small size while retaining its microporous structure, and which is particularly suitable for cigarette filters. However, the dispersion of powdered thermoplastic resin and non-solvent, from which the above-mentioned microporous polymer is made, may settle rapidly and may be adversely affected by thermal gradients during the fusion step. In addition, said fusion step must generally be carried out under elevated pressure, for example, in sealed tubes, autoclaves and the like. These factors may impose serious limitations on such a process, particularly when it is sought to mold articles of a desired shape having a uniform pore structure throughout. Plasticizers, when present in the powder dispersion in addition to the non-solvent, accentuate the non-uniformity in the product, most notably by forming an impermeable outer sheath or skin on the product.

We have discovered that a uniform microreticulated microporous structure of vinyl chloride polymer may be made, particularly in desired shapes, which may be employed for various uses, by a process which includes the following steps:

1. dispersing a vinyl chloride polymer latex in a selected organic non-solvent liquid,
2. preferably, although not necessarily, removing most of the water from the dispersion; most preferably this is accomplished by reduced pressure deaeration of the vinyl chloride polymer dispersion, and
3. heating the dispersion to sinter the vinyl chloride polymer particles, preferably while the dispersion is in a vessel having a desired shape, to form a microporous structure.

We have also discovered a novel particulate form of said microporous structure which is eminently suited for use as a filter material.

Accordingly, this invention relates to a novel process and to a novel product produced thereby. The product comprises a vinyl chloride polymer having an improved microporous structure and is made by a process which involves dispersing a vinyl chloride polymer latex, i.e., an aqueous colloidal suspension of a vinyl chloride polymer, in an organic liquid which is a non-solvent for the polymer, preferably removing most of the water, most preferably by reduced pressure deaeration of the dispersion, until the dispersion has a polymer content of from 3 to 70 percent by weight and a water content of less than 8 percent, and heating the dispersion to sinter the vinyl chloride polymer particles to form a microreticulated microporous structure. The products of this invention are particularly useful as filter materials and the process of the invention is especially suited for the formation of shaped porous articles which are useful as filters.

A preferred aspect of the present invention involves the formation of a shaped vinyl chloride polymer product comprising a vinyl chloride resin having a microporous structure comprising interconnected vinyl chloride polymer particles, defining a reticular capillary pore system extending from surface to surface of the structure.

The vinyl chloride resin employed in accordance with the present invention may be polyvinyl chloride or may be a vinyl chloride copolymer, for example, copolymers of vinyl chloride and vinyl acetate, copolymers of vinyl chloride and propylene, copolymers of vinyl chloride and alkyl esters of maleic acid, or a terpolymer prepared from three monomers, or compatible blends of resins, such as a blend of polyvinyl chloride and a polymer formed from esters of acrylic and methacrylic acids.

The vinyl chloride polymer latexes may be obtained commercially or prepared by conventional methods and should preferably contain from about 25 to 60 percent by weight of the polymer suspended in the aqueous phase.

Suitable vinyl chloride polymer latexes for use in the practice of this invention are obtainable by the polymerization of vinyl chloride or a mixture of vinyl chloride and other copolymerizable monomers in an aqueous emulsion, whereby the resultant polymer is obtained in the form of colloidally dispersed spherical particles having a diameter generally below one micron and more usually below 0.5 micron. Such latexes may be produced containing as much as 60 percent by weight of dispersed polymer. Satisfactory polymers include homopolymers of vinyl chloride and copolymers of vinyl chloride with up to 40 percent of one or more ethylenically copolymerizable comonomers, such as vinyl acetate, maleic esters, maleic anhydride, acrylic and methacrylic acids and their esters, vinylidene chloride, and the like. Mixtures of such polymers in latex form may be employed. Especially preferred latexes are of the non-film forming variety, namely, latexes which, upon evaporation of water at room temperature, will form a brittle powdery mass instead of a homogeneous, strong film.

The organic non-solvent liquid should be water-soluble or, preferably, water-miscible and should have a boiling point about 130° C., and exhibit substantially no solvating or swelling effect on the vinyl chloride polymer. Substances which are easily liquefiable, for example, by warming to 80° C., or by addition of small amounts of water, are suitable non-solvent liquids, provided they are employed under conditions in which they are in the liquid form. The non-solvent liquid preferably has a solubility parameter above 8.5, said solubility parameter being described in detail by P. A. Small in "Some Factors Affecting the Solubility of Polymers", J. Appl. Chem., 3, Feb., 1953, pages 71–80. Preferred non-solvent liquids are polyols, having boiling points above 130° C., for example glycols, such as ethylene glycol, diethylene glycol, triethylene glycol, propylene glycol, dipropylene glycol, tripropylene glycol, and the like, triols, such as glycerine and the like, and similar materials. Especially preferred non-solvent liquids are ethylene glycol, propylene glycol, and glycerine. Mixtures of materials, for example such as polyols, may, of course, be employed as the organic non-solvent liquid.

The latex may be mixed with the non-solvent liquid by conventional techniques, low shear methods being preferable. While either method may be employed, it is preferred to add the non-solvent liquid slowly to the latex, rather than to add the latex to the non-solvent liquid. From 0.4 to 33 parts, by weight, of the non-solvent should preferably be employed for each part of polymer contained in the latex.

The mixture of latex and non-solvent liquid is essentially a colloidal dispersion of the polymer particles in the non-solvent liquid containing water derived from the latex.

The dispersion is preferably subjected to a dehydration treatment to reduce the water content to below 8 percent by weight and preferably below 5 percent. The dehydration is preferably carried out by low pressure evaporative methods but may be carried out by exposure to desiccating agents or by other standard methods.

Dispersions containing between about 5 percent and 20 percent water can be dehydrated by subjecting them to temperatures of 80°–120° C., while they are maintained in a mold or the like, prior to sintering.

The dispersion, at the time of sintering, will generally contain at least 0.3 percent residual water. Such small amounts of residual water, although not essential, can provide a desired reduction in viscosity of certain non-solvent liquids.

The dehydrated or partially dehydrated dispersion should preferably have a polymer content of 3 to 70 percent by weight, and most preferably 10–35 percent. The lower ranges of polymer content provide microporous structures having higher pore volume, larger average pore size, and lower structural strength, by comparison with microporous structures obtained from dispersions of higher polymer content.

When the dispersion contains less than about 5 percent water, initially, no dehydration step is necessary prior to sintering. Such dispersion may be prepared for example by mixing 10 parts of a 50 percent latex with 90 parts of non-solvent liquid.

Following the dehydration treatment, if employed, or else directly following the formation of the dispersion, the dispersion is subjected to a heat treatment sufficient to cause the dispersed polymer particles to cohere or sinter together to form an integral monolith structure. Sintering is accomplished at a temperature of from about 130° C. to about 185° C., preferably from about 150° C. to 170° C. for a period of from 15 to 100 minutes and preferably from 30 to 60 minutes. Greater degrees of sintering, produced by the more severe heating conditions, provide structures having reduced pore volume, smaller average pore size, and greater strength. During the sintering treatment, the dispersion may either be confined to a mold of a desired configuration; spread out as a thin sheet; inserted as an impregnant in porous structures such as honeycombs, open-celled foams, fabrics, and the like; or may be in the form of droplets or still other forms. It is preferred to avoid massive shapes having no cross-sectional dimension smaller than 1 inch.

In general, it is preferred that the dispersion be maintained essentially motionless during the sintering operation. By appropriate choice of non-solvent and heating conditions, it is possible to form molded microporous articles which do not shrink and thereby faithfully reproduce the contours of the mold or produce non-cracked sheets. The sintered structure is preferably cooled while still in the mold or other confining means.

The sintered structure produced by the present process may be described as an integral monolith comprised of a multitudinous random array of interconnecting capillaries or interstices whose walls are composed of cohered spherical particles of polymer which, under electron microscopic examination are seen to substantially retain their individual identities. The effect of the sintering step, therefore, is to cause the polymer particles to interadhere at their points of contact, as opposed to causing complete melting of the particles to a molten form with loss of particle identity and consequent reduced surface area. The microporous structure is substantially uniform from surface to surface of shaped structures formed in accordance with this invention, although structures of graded pore density can be made by selective heat treatment during sintering. The average pore diameter may range from 0.2 micron for rigid porcelain-like shaped structures useful in bacterial filtration, to 20 microns in soft light-weight structures useful for acoustic absorption. Preferably, the average pore diameter will be between about 2 and about 14 microns. The total pore volume obtainable may range from 0.4 cc/gram for strongly sintered structures useful in bacterial filtration to 4.5 cc/gram for lightly sintered structures useful in aerosol filtration. The total surface area of the microporous structures may range from about 0.5 square meters/gram to about 12 square meters/gram. It may be noted in this connection that the total theoretical surface area of a polymer latex, namely, non-touching spheres of polyvinyl chloride of 0.2 micron diameter, is 21.4 square meters/gram. The microporous structures produced by the process of this invention, therefore, retain from about 5 percent to about 55 percent of the surface area of the starting material. This is essentially a measure of the degree of coherence of the microporous structure. The relatively large surface areas are a result of the retention of individual particle identity referred to supra.

As initially produced, the pores of the microporous structure are filled with the non-solvent liquid. In this form, the structure is useful in certain applications where it is sought to provide, from a shaped rigid source, a supply of a liquid such as the non-solvent liquid, or ingredients dissolved or dispersed therein. However, most applications for the microporous structures require extraction of the non-solvent liquid. This is accomplished most readily by contacting the microporous structure containing non-solvent with a relatively volatile solvent which will dissolve the non-solvent while having no affect on the polymer. The preferred extractant solvent is water. Other suitable solvents include the lower alcohols and ethers, for example ethanol, propanol, butanol, and the like. The extraction process may be carried out at ambient or elevated temperatures in batch-wise or continuous operation. When it is desired to granulate the shaped microporous structure to obtain a comminuted form useful for gas filtration or other purposes, the extraction step may be combined with the comminuting and/or sieving steps. Following extraction of the non-solvent liquid, the product may then be treated to remove the extraction solvent. Such treatment is most conveniently effected by conventional evaporative techniques employing vacuum, sweep gases or other principles. When it is sought to retain maximum porosity of the microporous structure, temperatures during evaporative drying should not exceed about 90° C. and should preferably not exceed 60° C.

The shaped microporous products made by the process of this invention are useful as filters, wicks, gas diffusers, liquid retainers, metering devices, absorbents, thermal and acoustic insulation, flotation devices, and support matrices for active solid particles and absorbed liquids. Typical shapes include tubes, thimbles, cones, slabs, sheets, and the like. The novel granular microporous product of the present invention is particularly adapted to utility in gas filtration, but is useful in many of the aforementioned applications for the shaped structures. The microporous material can be sterilized by careful heat treatment or preferably by chemical sterilizing agents such as ethylene oxide, for use in bacteriological investigation, hospital applications, pharmacological preparations, and the like. The microporous material may also be subjected to chemical transformation whereby the chemical nature of the polymer is altered with substantially no change in the internal micro-geometry of the material.

The microporous products may be subjected to postsintering by exposure to temperatures of 90° to 150° C. in either the dry state or impregnated with a non-solvent liquid different from that used in the formation of the microporous structure. During such treatment, the structure must be supported by a solid surface, a bed of powder, or a liquid to prevent thermal distortion of the structure. Such post-sintering reduces pore size and increases strength. The products also may be impregnated uniformly or in selected areas with a plasticizer or catalyzed monomer, and heated to effect in situ softening or hardening of the structure, respectively. Shaped microporous products can be subjected to various physical modifications for adaptation to specialized applications; such modifications include compressing, embossing, printing, machining, laminating, etc.

The exact nature of the pore structure of the microporous product is determined by the manner in which the dispersed polymer particles assemble and cohere during the sintering step. Although we do not wish to be bound by any particular theory with regard to the reaction mechanism, it is believed that the primary phenomenon controlling pore size is the relationship between the rate of interparticle cohesive bonding and the rate of particle migration. In this and the following paragraphs, through Table I, this phenomenon is discussed in greater detail.

The rate of interparticle bonding is dependent upon factors such as temperature, heat transfer, polymer type, surface charge effects, polarity of the non-solvent, and the concentration and size of the dispersed polymer particles. The rate of particle migration is dependent in large measure upon Stokes Law:

$$v = 2gr^2 (P_s - P_1)/9m$$

where $v$ is the limiting velocity of fall of a spherical particle of radius $r$ and density $P_s$ under the force of gravity alone in a liquid of density $P_1$ and viscosity $M$. In the case of polyvinyl chloride, $P_s = 1.40$. Thus, the influence of the liquid in controlling the settling rate of polyvinyl chloride particles is expressed by the fraction:

$$1.40 - P_1/M$$

Products having high surface area and satisfactory average pore diameter are produced by the process of this invention under conditions which minimize the velocity of settling. Such conditions include small particle size of the polyvinyl chloride particles, and appropriate selection of the non-solvent liquid so as to obtain a low value of the fraction $1.40 - P_1/M$. Data based on calculations and observations relating to certain non-solvent liquids employed with polyvinyl chloride particles are set forth in Table I;

TABLE I

| Non-Solvent Liquid | M (poises) | $P_1$ (g/cm³) | $1.40 - P_1/M$ | $v$ (cm/sec.)* |
|---|---|---|---|---|
| glycerine | 14.9 | 1.261 | $9.33 \times 10^{-3}$ | $2.03 \times 10^{-10}$ |
| propylene glycol | 0.56 | 1.036 | $6.50 \times 10^{-1}$ | $1.42 \times 10^{-8}$ |
| ethylene glycol | 0.209 | 1.113 | 1.373 | $2.99 \times 10^{-8}$ |
| decalin | 0.045 | 0.872 | 11.73 | $2.56 \times 10^{-7}$ |
| ethanol | 0.012 | 0.789 | 50.92 | $1.10 \times 10^{-6}$ |

*Calculation based on spherical polyvinyl chloride particles of 0.2 diameter.

As the data of Table I demonstrate, satisfactory liquids such as glycerine, propylene glycol and ethylene glycol provide values below 2.0. Liquids such as decalin and ethanol have values considerably above 2.0. In systems wherein the selected non-solvent liquid has too high a value for the above-mentioned fraction, a satisfactory low value may be obtained by increasing the liquid viscosity through the addition of certain high molecular weight polymers such as polyvinyl alcohol, polyvinyl pyrollidone, polyethylene glycol, and the like.

The shaped microporous products may contain certain additives via incorporation in the dispersion prior to sintering. Such additives include fine clays; other polymers in latex or powder form such as polyvinyl acetate, polystyrene, and other addition and condensation polymers; activated charcoal; graphite; carbon black; reinforcing fibers; powdered metals; catalysts; pigments; stabilizers; plasticizers; bacteriostats; flavorants; odorants; and other species. A particularly preferred additive is sub-micron sized positively charged particles, such as "Alon" alumina aerogel, a product of the Cabot Corporation. Electrically conductive graphite is also of interest as a filler. The additive, when employed, usually will be present in an amount from about 0.3 percent to about 24 percent by weight of the dispersion. Additives in liquid form may be incorporated into the microporous structure following its formation. Such additives may be pure liquids intended to coat or fill the pores and remain within the microporous structure, or may be solutions of liquid or solid solutes which are deposited within the pores when the solvent liquid is evaporated.

Granular microporous filter material produced in accordance with this invention has been found to be more effective than prior materials in removing particulate matter from tobacco smoke. The particulate matter of tobacco smoke consists of minute solid, oily and liquid particles suspended in the stream of smoke. These particles are collectively referred to as the total particulate matter, which for convenience, may be referred to as TPM. Although prior cigarette filter materials have been able to remove a certain portion of the TPM, the amount removed could be even greater. Additionally, the use of prior materials has often resulted in a high impedance to gas flow, thereby creating a resistance-to-draw (which for convenience may be referred to as RTD) uncomfortably high for the smoker. The RTD value is expressed in inches of water and satisfactory RTD values are below 6 inches of water.

Resistance-to-draw, was determined as follows:

A vacuum system was set to pull an air flow of 1,050 cc./min. by inserting the tapered end of a standard capillary tube through the dental dam of the cigarette holder and adjusting the reading on the water manometer to the correct RTD. The water level of the manometer was set at zero before inserting the standard capillary.

Then, the butt end of a cigarette or plug was inserted to a depth of 5 mm. in the dental dam of the cigarette holder. The pressure drop behind this cigarette with 1,050 cc./min. of air flow passing through was read directly as RTD (inches water) from the inclined water manometer.

Granular filter material produced in accordance with this invention, when employed in amounts of 20 to 80 milligrams in the tip of an 85 mm. cigarette, will remove 65–90 percent of the TPM at an RTD of 5 inches of water. When expressed as an index of TPM efficiency, namely, the percent TPM removed divided by the number of milligrams of filter material employed, the present filter material will have an index above 1.0. Prior filter materials have generally been found to have index values below 1.0.

Cigarette filter material is prepared from a molded or otherwise shaped sintered microporous structure prepared in accordance with the process of this invention by subjecting said molded structure to a high shear comminuting operation, preferably in the presence of a liquid slurrying agent, and sieving the particles so produced. The comminuting operation may be carried out in a Waring blender or other analogous device having sharp blades rotating at a very high speed. The liquid slurrying agent is a fluid having no solvating effect on the microporous structure. Said liquid is most conveniently water, or the non-solvent liquid employed in making the microporous structure, or mixture thereof. The comminuting operation can in fact also be employed for extracting the non-solvent from the microporous structure. The comminuted material is sieved either in the fluid slurry or in dry form to obtain particles of 20/100 mesh size, namely, particles which pass through a No. 20 U.S. Bureau of Standards sieve and are retained on a No. 100 sieve. A size range of 40/80 mesh is preferred for higher TPM removal efficiency and low RTD values. It is preferred to carry out the size classification, whether by sieving or other methods, while the particles are in an aqueous slurry or suspension, since the water enhances the removal from the particles of clinging fine particles.

The high shear treatment produces particles having a microreticulated microporous nucleus and peripheral cilia-like protrusions. The nucleus has essentially the geometrical configuration described hereinabove for the shaped microporous structure produced by the process of this invention. The cilia-like appendages, observable at magnification of 100S, are of irregular length and shape. Their presence is bepart of the glycerine into the polyvinyl acetate latex and part into the polyvinyl chloride copolymer latex. Then, the two latices were combined well to avoid coagulation. There was a slight thickening effect. The dispersion was dehydrated by entering it slowly into a 4 l flask under vacuum and at 40° C. The dispersion was then placed in a vacuum desiccator over $P_2O_5$ overnight. Water analysis: 3.3% $H_2O$.

A ¾ inch I.D. Carius tube was filled one-fourth of the way up. Air bubbles were present because of the high viscosity. A one hole rubber stopper was placed in the tube and a vacuum was pulled on the tube. The bubbles were very small and stable. The tube was placed in the oven vertically at 100° C. and the vacuum was pulled again. The bubbles now rose and broke. After 20 minutes, the vacuum tube was removed from the stopper and the temperature was raised to 150° C. After 45 minutes at 150° C., one-half inch of shrinkage was observed and the tube was removed and allowed to cool. The rod was washed in $H_2O$. It was soft, fairly uniform with small bubbles and microporous. The rod was cut up and placed in a beaker under running tap water overnight. It was then wet ground in $H_2O$ in a Waring blender and wet sieved between 40 and 100 mesh screens. The 40/100 mesh particles were smoke tested and gave a 75% TPM removal with a 60 mg. loading. The particulate filter material has an average pore diameter of 8.5 microns, total pore volume of 3.5 cc/gram, surface area 7.5 m²/gram and bulk volume of 12.2 cc/gram.

EXAMPLE 6

200 g. of glycerine was mixed with good agitation into 97.7 g. of a 50 percent solids latex of a copolymer of 85 percent vinylchloride and 15 percent dibutyl maleate. This mixture was dehydrated by adding one drop at a time into a 4 l flask maintaining a pressure of 1 mm. Hg immersed in a hot water bath at 60° C. The mixture was then placed in a vacuum desiccator over $P_2O_5$ overnight. The water analysis showed a 5.9% $H_2O$ content.

The dispersion, about 20 percent solids, was filtered into a 160 ml. mold of elongated thimble shape. The filtering was done to remove any gels which may have formed during dehydration. Then, in the mold, the dispersion was deaerated by pulling a vacuum on it in order to remove air bubbles trapped within the viscous dispersion during handling. The mandrel to form the thimble interior was coated with a film of a Teflon dispersion and wiped down well to insure a uniform coating. When deaeration was completed, the mandrel was placed in the mold carefully to prevent it from carrying air into the dispersion.

The mold was placed in an air circulating oven at 160° C. After 45 minutes, the mold was removed and allowed to cool at room temperature. A thimble formed and shrunk approximately one-half inch. The exuded glycerine was clear. The thimble surface was very smooth and without visible defects such as bubbles or cracks. The thimble was washed in $H_2O$ then removed from the mold and the mandrel was withdrawn. The thimble was placed in water overnight. Water was drawn through its pores using a vacuum. It was then placed aside to dry for 72 hours. The flow rate during washing at 22 mm. Hg was one liter in 10 minutes. A stopper and glass tubing were inserted and glued in the top of the thimble. The tubing reached almost to the bottom. The thimble was sterilized by placing it in the vacuum oven and evacuated to 1 mm. Hg. Ethylene oxide gas was allowed into the oven until pressure reached not quite 25 in. The thimble was allowed to remain in the oven, at room temperature, for 12 hours. The thimble was then submitted for bacterial filtration testing. The tests showed the thimble to have a maximum pore size less than 0.5 microns.

EXAMPLE 7

Using a dehydrated dispersion of 25 percent "Geon" 351 in glycerine formed as in Example 3, a thin (1–2 mm. depth) layer was poured into a petri dish and covered. This was placed in the oven at 155° C. After 20 minutes, slight shrinkage around the edges was noticeable and the dish was removed and allowed to cool. The sheet was microporous and possessed of good strength and flexibility. The top surface had a dull smoothness and was free from any significant bubbles or blisters. The bottom surface was reflectively smooth, indicating a finer pore size than the top surface. The sheet was washed in water and allowed to remain in water over a weekend. Using a 45 mm. I.D. die, four round discs were cut out of the sheet. The discs were mounted in a Millipore filter holder and tested in the filtration of particles of known size. A maximum pore size of 0.5 microns was thereby established for the discs.

EXAMPLE 8

One half gram of polyvinyl alcohol (sold under the trade name "Vinyl 350" by the Airco Corporation) was dissolved in 85 grams of propylene glycol containing 30 cc. water by stirring at 95° C. The resultant solution was slowly added at room temperature and with good stirring, to 26.8 grams of Geon 351 latex. The dispersion thus produced was then processed by a Rototherm wiped film evaporator (made by Artisan Industries of Waltham, Massachussets) operated at 0.5 mm. Hg vacuum and at room temperature. The treated dispersion, still containing 4 percent water, was placed in an open glass tray, forming a ½ inch layer. The tray was placed in an oven at 110° C. for 30 minutes in order to drive off residual water in the dispersion without attendant boiling. The temperature was then elevated to 130° C. and maintained for 30 minutes, whereupon a sintered integral microporous structure was formed. The dish was removed from the oven and cooled.

The microporous structure was removed from the dish, broken into small fragments, and placed in a Waring blender with sufficient water to cover the blades of the blender. The mixture was churned in the blender for 20 seconds, and the resultant slurry of particles was poured through a 40 mesh screen resting atop an 80 mesh screen. Thorough sieving and washing was achieved with a stream of running tap water. The granular material on the 80 mesh screen was vacuum dried at a temperature of 40° C.

Employing 37 mg. of the dry granular material in a compartment of a filter on a cigarette of 85 mm. length, 73% TPM removal was obtained (index 1.97). The surface area of the granular material was found to be 8.3 m²/gm., the total pore volume 5.0 cc/gm., and bulk volume 12.1 cc/gm. When rubbed between the fingers, the granular particles do not revert to a dust but instead form small compacted balls.

EXAMPLE 9

Eighty-five grams of ethylene glycol were slowly mixed into 26.8 grams of Geon 351 latex. The mixture was dehydrated to a water content of 5.5 percent of a Rototherm wiped film evaporator operated at room temperature and 0.5 mm. Hg pressure. The mixture was then placed in an uncovered dish and placed in an oven at 110° C. for 30 minutes. The dish was then covered and the oven temperature elevated to 150° C. for 27 minutes. At this stage, the mixture had formed a sintered monolith structure which begins to exude clear ethylene glycol. The monolith was removed from the dish and broken into small pieces which were placed in a Waring blender with enough water to cover the blades. High speed operation of the blender for 30 seconds converted the mixture to a pulp. The pulp was sieved through a 40 mesh screen placed atop an 80 mesh screen. Sieving was expedited with a flow of tap water into the material on the 40 mesh screen.

The sieved material was dried at room temperature. Employing 35 mg. of the dry granular material in a compartment of a filter on a cigarette of 85 mm. length, 71% TPM removal was obtained (index 2.03). The surface area of the material is 5.2 m²/g. The total pore volume is 4.2 cc/gm., and the bulk volume is 11.5 cc/gm. When rubbed between the fingers, the granular particles do not revert to a dust but instead form small compacted balls.

EXAMPLE 10

Eighty-seven parts of glycerine was slowly mixed into 23.6 parts of a polyvinyl chloride homopolymer latex (sold under the trade name "Polyco 2622" by the Borden Company and having 55 percent solids content). The mixture was dewatered on a Rototherm apparatus to a residual water content of 3.5 percent. The mixture was then placed in a covered tray and placed in an oven at 160° C. for 60 minutes. A sintered, integral microporous slab was thereby obtained. The slab was broken into small pieces which were placed in a Waring blender with water and converted into a pulp-like slurry by high speed agitation for 20 seconds. The slurry was wet-sieved with the use of running tap water to obtain granules of 40/80 mesh size.

The sieved material was dried in a fluidized bin utilizing air heated to 45° C. Employing 40 mg. of the dry granular material in a compartment of a filter on a cigarette of 85 mm. length, 83% TPM removal was obtained (index 2.07). The surface area of the material is 9.30 m²/gm. The total volume of pores smaller than 20 micron diameter is 4.00 cc/gm., and the bulk volume is 21.9 cc/gm.

The same granular material, when employed as an absorbent for crude petroleum oil spilled on a body of water, was found to absorb 6.2 grams of oil per gram of granules. The granules are unwetted by water and float on the water surface until contacted by a drop or pool of oil. The material is therefore highly effective in removing oil from the surface of a body of water where the oil exists dispersed as widely separated droplets.

EXAMPLE 11

A low density ½ inch thick batt of bonded fiber-glass was placed in a dish and impregnated with the dehydrated dispersion of Example 3. The dish was then placed in a vacuum chamber to remove air bubbles trapped within the batt. The deaerated structure was then heated in an oven at 160° C. for 50 minutes to cause formation of a solid microporous polyvinyl chloride structure within the interstices of the batt. The composite structure was then placed on a screen support of a vacuum funnel and washed by passing water through the structure. The dry product containing 13 percent by weight glass was found to be an acoustic absorber and has sufficient flexible and cohesive strength to be useful as a tile-like covering for ceiling or wall surfaces.

EXAMPLE 12

95 g. of glycerin was mixed into 9.1 g. of Polyco 2622. No dehydration was necessary, as the water content was 3.9 percent. The dispersion was poured into an uncovered dish and placed in an oven at 160° C. After 60 minutes, the dish was removed from the oven. The dispersion had sintered to form a solid, microporous structure. The structure was wet ground in water in a Waring blender and wet sieved −40/+80 mesh. The 40/80 particles were allowed to air-dry. The material gave an 86% reduction in TPM at a 22 mg. loading (TPM Index 3.91).

The 40/80 material was found not to powder when rubbed between the fingers. It had an external surface area of 12 m²/g, as found by a Knudsen 1401 flow permeameter, a bulk volume of 25 cc/gram, an average pore size of 9.2 microns and pore volume of 4.1 cc/gram.

The dry 40/80 mesh particles were found to absorb 7.8 times their weight of oil floating on a sea water surface. In a further use of the material, a ½ inch I.D. glass column filled with the 40/80 mesh material was employed as a chromatographic column. The column was found capable of separating oleophilic from hydrophilic compounds in an ethanol solution, the oleophilic substances exhibiting larger retention time on the column.

By following the teachings of this invention, microporous structures are obtained having better uniformity, greater porosity, and higher strength than similar structures made via prior methods. Cigarette filter granules made via this process exhibit better TPM removal efficiencies than any previous material. The process is more versatile than techniques such as those based upon the use of polymer powders, since various pore sizes can be achieved and various polymers can be employed. No highly inflammable solvents are employed. Unlike prior methods, the present process does not require the presence of a plasticizer, and can be carried out in a manner such that little dimensional change occurs in the transition from precursor fluid to shaped solid, thereby permitting sheet casting without crack formation, and improving the production of molded articles. The precursor dispersions are not subject to settling upon standing.

We claim:

1. A process for preparing a microporous product which comprises forming a colloidal dispersion of a latex of a vinyl chloride polymer in which the polymer is in aqueous colloidal suspension in a water-soluble organic non-solvent for the polymer, said non-solvent having a solubility parameter of above 8.5, and being present in an amount from 0.4 to 33 parts by weight for each part of polymer, and thereafter heating the dispersion to cause the colloidal polymer particles to cohere at their points of contact to form a microporous product having a large surface area.

2. The process of claim 1 wherein said non-solvent is miscible with water and is further characterized by the formula:

$$1.40 - P_1/M < 2.0$$

wherein $P_1$ and $M$ are the density and viscosity, respectively, of said non-solvent.

3. The process of claim 1, wherein the nonsolvent is a water-soluble, organic polyhydroxy compound having a boiling point above 130° C.

4. The process of claim 3, wherein the non-solvent is glycerine.

5. The process of claim 3, wherein the non-solvent is ethylene glycol.

6. The process of claim 3, wherein the non-solvent is propylene glycol.

7. The process of claim 1, wherein the polymer is polyvinyl chloride.

8. The process of claim 1, wherein the polymer is a copolymer of vinyl chloride and a second vinyl monomer, said copolymer containing at least 60 percent by weight of vinyl chloride.

9. The process of claim 1, wherein the dispersion contains between 0.3 percent and 8 percent water and between 3 percent and 70 percent vinyl chloride polymer.

10. The process of claim 1, wherein the water content of the dispersion is reduced by placing the dispersion in an environment maintained at a pressure below about 2 mm. of mercury and the resulting dispersion is heated at a temperature of from about 130° C. to about 185° C. for about 15 minutes to about 100 minutes to sinter the resin.

11. The process of claim 1 wherein the non-solvent is removed from said microporous product by extraction with an aqueous medium in which said water-soluble non-solvent is soluble.

* * * * *

UNITED STATES PATENT OFFICE
CERTIFICATE OF CORRECTION

Patent No. 3,674,722           Dated July 4, 1972

Inventor(s) Norman B. Rainer et al

It is certified that error appears in the above-identified patent and that said Letters Patent are hereby corrected as shown below:

Column 6, after line 75, insert the following:

lieved to result in the particularly effective removal of TPM at low RTD values. It has been found that a general measure of the degree of ciliation of the particles can be obtained by determining the bulk volume of the washed and dried filter granules.

When employed in a tobacco smoke filter, the microporous granules are preferably employed having a bulk volume greater than about 7 cc/gram and may be confined within a compartment of a filter tip, said compartment bounded on the mouth end by a conventional fiber tow and on the other end by either another segment of fiber tow or the tobacco rod itself. Such filter construction has in fact been employed for the purposes of the present invention in testing the effectiveness

UNITED STATES PATENT OFFICE
CERTIFICATE OF CORRECTION

Patent No. 3,674,722          Dated July 4, 1972

Inventor(s) Norman B. Rainer et al          PAGE 2 of the granular filter material. In such tests, sufficient granular filter material was employed to secure an overall cigarette RTD of 5 inches water. Other ingredients may be admixed with the filter material in such cigarette filter constructions.

The particulate filter material may be employed in still other ways in tobacco smoke filtration and in the filtration of other gases and liquids. The material may also be employed in a number of the various uses set forth hereinabove for the non-comminuted shaped microporous structures produced by the process of this invention. The granules may further be mixed with binders such as low melting waxes, adhesives and the like, and used to construct shaped microporous objects or produce porous coatings on surfaces of articles.

As described and employed in this specification, measurements of average pore size and total pore volume are made using a mercury intrusion porosimeter made by the American Instrument Corporation of Silver Springs, Md. Similarly, measurements of surface-area are made using a Knudsen Flow Permeameter made by the Micromeritics Instrument Corp. of Norcross, Georgia.

UNITED STATES PATENT OFFICE
CERTIFICATE OF CORRECTION

Patent No. 3,674,722　　　　　　　Dated July 4, 1972

Inventor(s) Norman B. Rainer et al　　　PAGE 3

The following examples are illustrative:

Example 1

To 85 parts of a latex containing 52% by weight of a copolymer of 80% vinyl chloride and 20% dibutyl maleate with constant slow stirring was slowly added 215 parts of glycerine to form a dispersion. The dispersion was placed in a shallow tray in a vacuum oven maintained at a temperature of 40°C. and 0.5 mm. Hg pressure. After 12 hours, the water content of the dispersion was reduced to 1.3%. The dehydrated dispersion was then transferred to a vertical open tube which was placed in an oven at a temperature of 130°C. for 40 minutes. A rod was formed in the tube conforming to the shape of the tube without shrinkage. The rod was dissected and found to be bubble-free and uniformly microporous. Porosimeter analysis of the rod showed a large pore size distribution, with many pores smaller than 6 microns, and a total pore volume of 2.44 cc./g.

UNITED STATES PATENT OFFICE
CERTIFICATE OF CORRECTION

Patent No. 3,674,722      Dated July 4, 1972

Inventor(s) Norman B. Rainer et al      PAGE 4

Example 2

To 26.8 parts of a latex containing 56% by weight of a vinyl acetate-acrylic copolymer, containing 85% vinyl acetate and 15% of butyl methacrylate, 85 parts of glycerine was slowly added with constant slow stirring to form a uniform dispersion. The dispersion was dehydrated to a water content of 1.5% in a vacuum oven maintained at a temperature of 40°C. and 0.5 mm. Hg pressure. Similarly, to 26.8 parts of a latex (sold under the trade name "Geon" 351 by B. F. Goodrich Chemical Co.) containing 56% by weight of vinyl chloride was added with constant slow stirring 85 parts of glycerine to form a uniform dispersion. The dispersion was dried in a vacuum oven maintained at a temperature of 70°C. and 0.5 mm. Hg pressure to a water content of 2.2%. Seven parts of the vinyl acetate dispersion were mixed with 60 parts of the "Geon" dispersion, whereupon some thickening was observed. The resulting mixture was heated in a capped but vented 1 x 6 inch Carius tube placed nearly horizontally in an oven and heated 40 minutes at 155°C., 10 minutes at 160°C., and 10 minutes at 167°C. The contents had solidified with slight yellowing but little or no shrinkage or exudation of glycerine. The product was

UNITED STATES PATENT OFFICE
CERTIFICATE OF CORRECTION

Patent No. 3,674,722　　　　Dated July 4, 1972

Inventor(s) Norman B. Rainer et al.　　PAGE 5 spongy. It was cut into slices and washed with running water. The wafers appeared uniformly microporous and bubble-free. The average pore size was 16 microns, the total pore volume 3.9 cc/gram, and the surface area 3.4 $m^2/gm$.

Example 3

To 26.8 parts of the Geon 351 latex of Example 2, 85 parts of glycerine was slowly added with constant slow stirring to form a dispersion. The dispersion was dehydrated to a water content of 2.2% by maintaining it at a temperature of 40°C. and 0.5 mm. Hg. Similarly, to 26.8 parts of a latex containing 56% by weight of a copolymer containing 85% of vinyl chloride and 15% of vinyl acetate and plasticized by 20% of dioctyl phthalate, 85 parts of glycerine was slowly added with constant slow stirring to form a uniform dispersion which was subsequently dehydrated. 70 parts of the dispersion of Geon 351 were mixed with 30

UNITED STATES PATENT OFFICE
CERTIFICATE OF CORRECTION

Patent No. 3,674,722          Dated July 4, 1972

Inventor(s) Norman B. Rainer et al.      PAGE 6 parts of the dispersion of the plasticized latex. The resulting mixture was poured into a 3/4 inch diameter tube mold and placed in an oven in a vertical position for 40 minutes at 165°C. A microporous rod forms and contracts slightly with separation of some glycerine. The rod was sliced into wafers which were washed overnight with running water.

The product was pulverized under water by action of a laboratory blender, and wet-sieved with 40 and 100 mesh screens. The -40 +100 mesh granular material was rewashed with ethanol, and dryed over phosphorus pentoxide. Sixty milligrams of the material were placed in a filter tip of an 85 mm. length cigarette, the material being confined on the upstream end by the tobacco rod, on the downstream end by a cellulose acetate fiber plug, and on the sides by paper mouthpiece wrapper. The overall cigarette plus filter gave a 5" RTD. Sixty-eight percent TPM removal was obtained, for a TPM removal index of 1.15. The granular microporous material has an average pore size of six microns, pore volume of 2.3 cc/gm., surface area of 3 $m^2$/gm., and bulk volume of 9.5 cc. gram.

UNITED STATES PATENT OFFICE
CERTIFICATE OF CORRECTION

Patent No. 3,674,722    Dated July 4, 1972

Inventor(s) Norman B. Rainer et al.    PAGE 7

Example 4

To 182 parts of polyvinyl chloride latex was added with stirring 609 parts of glycerine. The dispersion was dehydrated by introducing it dropwise into an evacuated flask at room temperature. The dispersion was left for 16 hours under vacuum in a desiccator with $P_2O_5$. Analysis showed 1.0% water and 15% polymer content.

A large (1 inch diameter) Carius tube was filled 3/4 of the way with sample. It was capped with a vented cap and placed upright in the oven at 155°C. After 51 minutes, 2 inches of shrinkage had occurred and the tube was removed and allowed to cool to room temperature. The rod was washed in $H_2O$ and examined. It was hard, microporous and very uniform inside and out. It was then cut into chips (or wafers) and washed overnight in cold tap water. The wafers were then comminuted to granular form in water in a Waring blender for 15 seconds and then wet sieved. Two separate sieving operations were performed. First, half of the particles were sieved between 40 and 80 mesh screens and the 40/80 mesh particles were set

UNITED STATES PATENT OFFICE
CERTIFICATE OF CORRECTION

Patent No. 3,674,722      Dated July 4, 1972

Inventor(s) Norman B. Rainer et al.    PAGE 8 aside. Next, the rest of the particles were sieved between 60 and 100 mesh screens and the 60/100 mesh particles were set aside. Both of these samples (40/80 and 60/100) were smoke tested. The 40/80 particles gave a 75% TPM removal at a 70 mg. loading. The 60/100 particles gave a 78% TPM removal at 60 mg. loading. The granular filter material has an average pore diameter of 7 microns, a pore volume of 2.26 cc/gram, a surface area of 4.2 $m^2$/gram and a bulk volume of 10.5 cc/gram.

Example 5

Glycerine, 261 g. was added to 76.2 of a latex of a copolymer of 80% vinyl chloride and 20% dibutyl maleate and 10.9 g. of a polyvinyl acetate latex by first mixing

UNITED STATES PATENT OFFICE
CERTIFICATE OF CORRECTION

Patent No. 3,674,722          Dated July 4, 1972

Inventor(s) Norman B. Rainer   et al.    PAGE 9

It is certified that error appears in the above-identified patent and that said Letters Patent are hereby corrected as shown below:

Signed and sealed this 19th day of December 1972.

(SEAL)
Attest:

EDWARD M. FLETCHER, JR.　　　　　　　　ROBERT GOTTSCHALK
Attesting Officer　　　　　　　　　　　Commissioner of Patents